US010782500B1

(12) United States Patent
Ball

(10) Patent No.: US 10,782,500 B1
(45) Date of Patent: Sep. 22, 2020

(54) FIBER OPTIC FURCATION UNITS, KITS, AND METHODS

(71) Applicant: AFL Telecommunications LLC, Duncan, SC (US)

(72) Inventor: Shirley Ball, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/664,110

(22) Filed: Oct. 25, 2019

(51) Int. Cl.
*G02B 6/44* (2006.01)
*G02B 6/46* (2006.01)

(52) U.S. Cl.
CPC ......... *G02B 6/4471* (2013.01); *G02B 6/4472* (2013.01); *G02B 6/46* (2013.01)

(58) Field of Classification Search
CPC .......................... G02B 6/4471; G02B 6/4472
See application file for complete search history.

(56) References Cited

U.S. PATENT DOCUMENTS

| | | | |
|---|---|---|---|
| 6,379,052 B1 | 4/2002 | de Jong et al. | |
| 6,438,299 B1 | 8/2002 | Brown et al. | |
| 6,614,971 B2 | 9/2003 | Sun et al. | |
| 7,512,308 B2 | 3/2009 | Barnes et al. | |
| 7,604,472 B2 | 10/2009 | Hayes, Jr. et al. | |
| 7,613,376 B2 | 11/2009 | Wright et al. | |
| 7,664,363 B1* | 2/2010 | Mowery, Sr. ........ | G02B 6/3887 385/137 |
| 7,703,990 B1 | 4/2010 | de Jong et al. | |
| 8,401,353 B2 | 3/2013 | Barker et al. | |
| 9,417,420 B2 | 8/2016 | Fisher et al. | |
| 9,529,173 B2 | 12/2016 | Courchaine et al. | |
| 9,964,727 B2 | 5/2018 | Islam | |
| 10,185,093 B2 | 1/2019 | Kleeberger et al. | |
| 2008/0138026 A1* | 6/2008 | Yow .................... | G02B 6/4471 385/137 |
| 2017/0102506 A1* | 4/2017 | Newbury ............ | G02B 6/3879 |
| 2017/0276884 A1* | 9/2017 | Islam .................. | G02B 6/4471 |
| 2018/0149823 A1* | 5/2018 | Wang .................. | G02B 6/4478 |
| 2019/0004272 A1 | 1/2019 | Field | |
| 2019/0196129 A1* | 6/2019 | Wittmeier ........... | G02B 6/3878 |

(Continued)

FOREIGN PATENT DOCUMENTS

DE 4333566 A1 5/1994
EP 1559983 B1 8/2007
(Continued)

*Primary Examiner* — Michelle R Connelly
(74) *Attorney, Agent, or Firm* — Dority & Manning, P.A.

(57) ABSTRACT

Fiber optic furcation units, methods for assembling fiber optic furcation units, and fiber optic furcation kits for assembling fiber optic furcation units are provided. A method for assembling a fiber optic furcation unit includes inserting a furcation tube into a passage defined in a furcation block such that a first end portion of the furcation tube is disposed within a first end portion of the passage and the furcation tube extends from a second end of the passage. A first end of the passage has a diameter greater than a diameter of the second end of the passage. The method further includes flaring the first end portion of the furcation tube such that an inner diameter of the first end of the furcation tube increases. The method further includes inserting an optical fiber into the furcation tube through the first end of the furcation tube.

18 Claims, 2 Drawing Sheets

(56) References Cited

U.S. PATENT DOCUMENTS

2019/0369340 A1* 12/2019 Ramasubramanian ..................... G02B 6/4472
2020/0103609 A1* 4/2020 Lockhart .............. G02B 6/4472

FOREIGN PATENT DOCUMENTS

JP        4798875 B2    10/2011
WO     2005056325 A2     6/2005

* cited by examiner

FIBER OPTIC FURCATION UNITS, KITS, AND METHODS

FIELD

The present disclosure relates generally to fiber optic furcation units, methods for assembling fiber optic furcation units, and fiber optic furcation kits for assembling fiber optic furcation units.

BACKGROUND

The ability of high-quality optical fiber to transmit large amounts of information without appreciable signal degradation is well known. As a result, optical fibers have found widespread use in many applications, such as voice and data transmission. Particularly in the private network and industrial markets, there is a continuing trend in which copper-based wiring is being replaced with fiber optic cabling for communication and sensing applications.

Optical fiber is typically supplied and installed as fiber optic cable. The term "fiber optic cable" refers to the combination of the actual optical fiber plus the structure in which it is carried and protected during and after installation. A fiber optic cable may include, for example, optical fiber(s), aramid fibers or other strength members, and an outer jacket. Multiple optical fibers are often combined in a multi-fiber cable. Multi-fiber cables efficiently carry the requisite number of fibers to the point(s) of applied use, where it is then necessary to separate each individual optical fiber and terminate the individual optical fibers with fiber optic connectors.

Furcation assemblies or units generally serve as a means to facilitate the separation of optical fibers of multi-fiber cables by providing a protective housing for transitioning the individual optical fibers from the multi-fiber cable. However, improvements could be made to currently known furcation unit designs.

For example, in many cases, a furcation unit includes one or more furcation tubes and a furcation block which retains portions of the tubes therein. In order to retain the tubes within the furcation block, existing technology utilizes adhesives such as cyanoacrylate during the assembly process. Such assembly process is very sensitive to bond length, adhesive selection and process variation. Issues can arise when the assembler does not apply a consistent amount of adhesive, or enough adhesive to obtain a sufficient bond between the furcation block and each individual tube.

Further, the particular adhesive selected for a given application can have detrimental effects on the product. For example, many adhesives are moisture sensitive and therefore can outgas undesirable 'whitening' during curing, which can affect the cosmetics of the assembly. Additionally, the various adhesives available for fast curing are sometimes not effective for bonding the typical furcation tube material (for example, Hytrel, etc.) to the furcation block material (for example, a polymer such as a polycarbonate, a nylon, etc.).

Still further, in current design, the furcation block and furcation tubes should have consistent, tight tolerances such that the tubes can be assembled into the block without interference. However, the tolerances must also be such that there is not excess clearance, in order that adequate adhesive bonding between the block and tubes is facilitated.

The above-identified issues generally cause both the cost of resulting furcation units and the time to assembly such furcation units to be relatively high. Accordingly, improved fiber optic furcation units, methods for assembling fiber optic furcation units, and fiber optic furcation kits for assembling fiber optic furcation units desired in the art. For example, fiber optic furcation units, methods for assembling fiber optic furcation units, and fiber optic furcation kits for assembling fiber optic furcation units which address and/or eliminate one or more of the above-identified issues would be advantageous.

BRIEF DESCRIPTION

Aspects and advantages of the methods, units, and kits in accordance with the present disclosure will be set forth in part in the following description, or may be obvious from the description, or may be learned through practice of the technology.

In accordance with one embodiment, a method for assembling a fiber optic furcation unit is provided. The method includes inserting a furcation tube into a passage defined in a furcation block such that a first end portion of the furcation tube is disposed within a first end portion of the passage and the furcation tube extends from a second end of the passage. The passage extends along a longitudinal axis between a first end and the second end and includes the first end portion which includes the first end and a second end portion which includes the second end. The furcation tube extends between a first end and a second end and includes the first end portion which includes the first end and a second end portion which includes the second end. The first end of the passage has a diameter greater than a diameter of the second end of the passage. The method further includes flaring the first end portion of the furcation tube such that an inner diameter of the first end of the furcation tube increases. The method may further include inserting an optical fiber into the furcation tube through the first end of the furcation tube.

In accordance with another embodiment, a fiber optic furcation unit is provided. The furcation unit includes a furcation block. The furcation block defines a plurality of passages, each of the plurality of passages extending along a longitudinal axis between a first end and a second end and including a first end portion which includes the first end and a second end portion which includes the second end. The first end of each of the plurality of passages has a diameter greater than a diameter of the second end of that passage. The furcation unit further includes a plurality of furcation tubes, each of the plurality of furcation tubes disposed within and extending from one of the plurality of passages. Each of the plurality of furcation tubes extends between a first end and a second end and includes a first end portion which includes the first end and a second end portion which includes the second end. The first end portion of each of the plurality of furcation tubes is disposed within the first end portion of one of the plurality of passages. The first end of each of the plurality of furcation tubes has an inner diameter that is greater than an inner diameter of the second end of that furcation tube.

In accordance with another embodiment, a fiber optic furcation kit for assembling a fiber optic furcation unit is provided. The fiber optic furcation kit includes a furcation block, the furcation block defining a plurality of passages. Each of the plurality of passages extends along a longitudinal axis between a first end and a second end and includes a first end portion which includes the first end and a second end portion which includes the second end. The first end portion of each of the plurality of passages tapers from the first end of that passage to the second end portion of that passage such that the first end of each of the plurality of passages has a diameter greater than a diameter of the second end of that passage. The fiber optic furcation kit further includes an expansion tool insertable into each of the plurality of passages. The expansion tool includes at least one pin member including a tapered end portion.

These and other features, aspects and advantages of the present methods, units, and kits will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF FIGURES

A full and enabling disclosure of the present methods, units, and kits, including the best mode of making and using the present systems and methods, directed to one of ordinary skill in the art, is set forth in the specification, which makes reference to the appended figures, in which.

DETAILED DESCRIPTION

Figure 1:
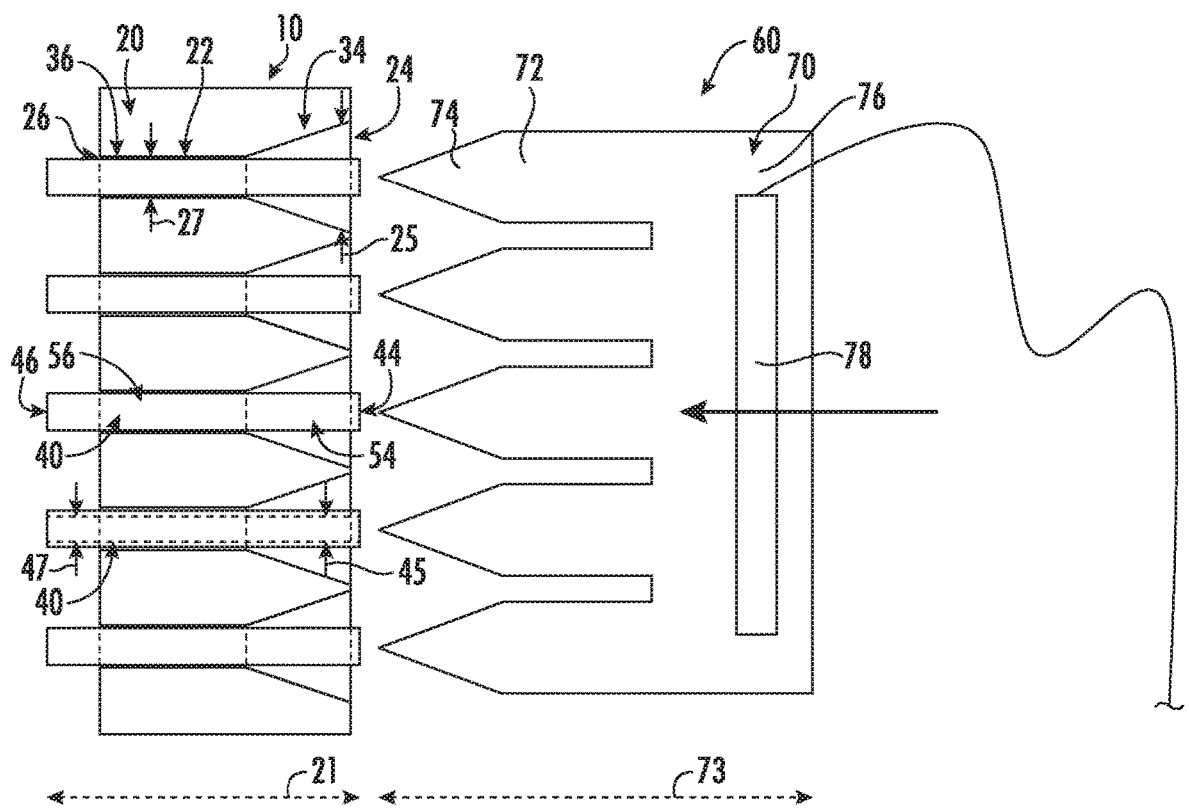
FIG. 1 is a side cross-sectional view of a plurality of furcation tubes inserted in a furcation block prior to flaring of the furcation tubes with an expansion tool in accordance with embodiments of the present disclosure.

Reference now will be made in detail to embodiments of the present methods, units, and kits, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to FIGS. 1 through 4, the present disclosure relates generally to fiber optic furcation units, methods for assembling fiber optic furcation units, and fiber optic furcation kits for assembling fiber optic furcation units. Such units, methods, and kits in accordance with the present disclosure advantageously facilitate improved fiber optic furcation by creating large optical fiber insertion targets (e.g. into ends of the furcation tubes) while maintaining desired color identification codings. Further, such units, methods, and kits in accordance with the present disclosure advantageously reduce or eliminate the need to utilized adhesives when creating the furcation units. This increases the reliability of the assembly, reduces the use of potentially hazardous materials in the manufacture of the assembly, and reduces the cost and time associated with manufacturing of the assembly. Further, this allows the furcation block to be smaller in length due to an elimination of any need for a long adhesive bonding length.

A fiber optic furcation unit 10 in accordance with the present disclosure includes a furcation block 20. In exemplary embodiments, furcation block 20 may be formed from a suitable polymer material, such as a suitable thermoplastic, such as in exemplary embodiments a polycarbonate or nylon. Alternatively, other suitable materials such as metals may be utilized. Furcation block 20 may define a plurality of passages 22, each of the plurality of passages 22 extending along a longitudinal axis 21 between first end 24 and an opposing second end 26. The first end 24 and second end 26 may each be an opening defined in opposing surfaces of the furcation block 20, as shown. In exemplary embodiments, the longitudinal axis 21 of the passages 22 are parallel to each other.

Each passage 22 may further include a first end portion 34 and a second end portion 36. The first end portion 34 may include and extend from the first end 24, such as towards the second end 26. The second end portion 36 may include and extend from the second end 26, such as towards the first end 24. In exemplary embodiments, the first end portion 34 and second end portion 36 may be in direct communication with each other, such that there are no intervening portions. Alternatively, however, one or more intervening passage portions may be disposed between the first end portion 34 and second end portion 36.

A diameter 25 may be defined for the first end 24 and first end portion 34 generally, and a diameter 27 may be defined for the second end 26 and second end portion 36 generally. The diameters 25, 27 may each generally be defined as the maximum width of the passage 22 at a particular location (e.g. first end 24, first end portion 34, second end 26, or second end portion 36). In exemplary embodiments, the diameter 25 at the first end 24 is greater than the diameter 27 at the second end 26. Further, in exemplary embodiments, the first end portion 34 tapers, such as from the first end 24 towards (and in exemplary embodiments to) the second end portion 36.

Still further, in exemplary embodiments, the diameter 27 of the second end portion 36 may be constant throughout the second end portion 36, including the second end 26. Accordingly, the diameter 25 at the first end 24 may be greater than the diameter 27 of the entire second end portion 36. Further, the diameter 25 may taper from the first end 24 through the entire first end portion 34 to the diameter 27 at the second end portion 36 (e.g. at the intersection between the first end portion 34 and second end portion 36).

Furcation unit 10 may further include a plurality of furcation tubes 40. Furcation tubes 40 may generally be formed from, for example, suitable polymers, such as suitable thermoplastics, such as suitable thermoplastic elastomers, such as suitable thermoplastic polyester elastomers. Each furcation tube 40 in a furcation unit 10 may have a different color, such that a desired color identification coding is maintained in the unit 10. Each furcation tube 40 may be disposed within and may extend from a passage 22 of a furcation block 20. In particular, each furcation tube 40 may extend from the second end 26 of an associated passage 22.

Each furcation tube 40 may define a passage 42 which extend therethrough, such that the furcation tube 40 is generally hollow. Further, each furcation tube 40 may extend between a first end 44 and a second end 46 (both of which may also define ends of the passage 42, such that the passage 42 is generally open). Each furcation tube 40 may further include a first end portion 54 and a second end portion 56. The first end portion 54 may include and extend from the first end 44, such as towards the second end 46. The second end portion 56 may include and extend from the second end 46, such as towards the first end 44. In exemplary embodiments, the first end portion 54 and second end portion 56 may be in direct communication with each other, such that there are no intervening portions. Alternatively, however, one or more intervening tube portions may be disposed between the first end portion 54 and second end portion 56.

As discussed, each furcation tube 40 may be disposed within and may extend from one of the plurality of passages 22. For example, the first end portion 54 of each furcation tube 40 may be disposed within (either partially or fully) the first end portion 34 of an associated passage 22. The first end 44 may be disposed within the first end portion 54 of the associated passage 22 or may be exterior to the associated passage 22 as shown. The second end portion 56 of each furcation tube 40 may be disposed partially within the second end portion 36 of an associated passage 22 and may extend from the passage 22 (e.g. from the second end 26 thereof). Accordingly, the second end 46 of each furcation tube 40 may be exterior to the associated passage 22.

An inner diameter 45 may be defined for the first end 44 and first end portion 54 generally, and an inner diameter 47 may be defined for the second end 46 and second end portion 56 generally. The inner diameters 45, 47 may each generally be defined as the maximum width of the passage 42 at a particular location (e.g. first end 44, first end portion 54, second end 46, or second end portion 56). In exemplary embodiments when assembled in the unit 10, the inner diameter 45 at the first end 44 is greater than the inner diameter 47 at the second end 46. Further, in exemplary embodiments, the first end portion 54 tapers, such as from the first end 44 towards (and in exemplary embodiments to) the second end portion 56.

Still further, in exemplary embodiments, the inner diameter 47 of the second end portion 56 may be constant throughout the second end portion 56, including the second end 46. Accordingly, the inner diameter 45 at the first end 44 may be greater than the inner diameter 47 of the entire second end portion 56. Further, the inner diameter 45 may taper from the first end 44 through the entire first end portion 54 to the inner diameter 47 at the second end portion 56 (e.g. at the intersection between the first end portion 54 and second end portion 56).

As discussed, in exemplary embodiments when assembled in the unit 10, the inner diameter 45 at the first end 44 of each furcation tube 40 is greater than the inner diameter 47 at the second end 46. For example, the inner diameter 45 of the first end 44 of each furcation tube 40 may in some exemplary embodiments be between 50% and 350% greater, such as between 150% and 300% greater, such as between 200% and 275% greater, such as between 225% and 275% greater, than the inner diameter 47 of the second end 46 of that furcation tube 40.

In exemplary embodiments, no adhesive is utilized to connect any of the furcation tubes 40 to the furcation block 20, and thus there is no adhesive bond between any furcation tube 40 and the furcation block 20. The differential between the inner diameter 45 and inner diameter 47 advantageously impedes or prevents removal of the furcation tube 40 from the furcation block 20 at least in a direction from the first end 24 towards the second end 26.

In some exemplary embodiments, a furcation unit 10 may further include a plurality of optical fibers 12. Each of the plurality of optical fibers 12 may be disposed in one of the plurality of furcation tubes 40, such as in the passage 42 thereof. The optical fibers 12 may be inserted into the furcation tubes 40 through the first ends 44 thereof. The increased inner diameters 45 of the first ends 44 may, in addition to eliminating the requirement for use of an adhesive, provide a larger "target" area for insertion of the optical fibers 12 into the passages 42 of the furcation tubes 40, thus advantageously increasing the ease of assembly and reducing the time of assembly.

The present disclosure is further directed to fiber optic furcation kits 60 for assembling fiber optic furcation units 10. A kit 60 may include, for example, a furcation block 20 as discussed herein. A kit 60 may further include, for example, a plurality of furcation tubes 40 as discussed herein. A kit 60 may further include, for example, a plurality of optical fibers 12 as discussed herein.

Notably, in exemplary embodiments furcation tubes 40 provided in a furcation kit 60 and prior to insertion in furcation units 10 may have inner diameters 45 at the first ends 44 thereof which are equal to the inner diameters 47 at the respective second ends 46, and the inner diameters 45 of the first end portions 54 may be constant and equal to the inner diameters 47 of the respective second end portions 56. Assembly of the furcation unit 10 may cause flaring of the first end portions 54 and an associated increase in the diameters 45 to the increased diameters 45 as discussed herein. Alternatively, however, the furcation tubes 40 provided in a kit 60 in accordance with the present disclosure may be pre-flared and thus already have the increased diameters 45 as discussed herein.

A furcation kit 60 may further include an expansion tool 70. The expansion tool 70 may advantageously be utilized to flare the first ends 44 and first end portions 54 of the furcation tubes 40, such that the inner diameter 45 at the first end 44 is greater than the inner diameter 47 at the second end 46 as discussed herein and, in exemplary embodiments, such that the first end portion 54 tapers, such as from the first end 44 towards (and in exemplary embodiments to) the second end portion 56.

Expansion tool 70 may be insertable into each of the plurality of passage 22 and into each of the plurality of passages 42 in order to facilitate such flaring. Such insertion may be simultaneously or in series.

Expansion tool 70 may include, for example, one or more pin members 72. Each pin member 72 may include a tapered end portion 74. When more than one pin member 72 is provided in expansion tool 70, the pin members 72 (such as longitudinal axes 73 thereof) may be parallel to each other. Expansion tool 70 may further include a body 76 from which the pin members 72 extend and are cantilevered. The tapered end portions 74 may be the distal end portions from the body 76.

In some embodiments, expansion tool 70 may be formed from a suitable metal (such as aluminum) or other conductive material. Alternatively, other suitable materials may be utilized.

In some embodiments, expansion tool 70 may further include a heater 78. The heater 78 may advantageously provide heat to the pin members 72, thus heating the pin members 72 such that the heat can be transferred to the furcation tubes 40 (e.g. the first end portions 54 thereof) during use of the expansion tool 70 when assembling a furcation unit 10.

The present disclosure is further directed to methods for assembling fiber optic furcation units 10. In some embodiments, methods in accordance with the present disclosure may utilize one or more components of a furcation kit 60 as discussed herein.

A method may include, for example, the step of inserting each of one or more furcation tubes 40 into one or more respective passages 22 defined in a furcation block 20 (as shown, for example, in FIG. 1). When inserted, a first end portion 54 of each furcation tube 40 is disposed within a first end portion 34 of the respective passage 22 and each furcation tube 50 extends from a second end 26 of the respective passage 22, as discussed herein.

In exemplary embodiments, such insertion is in a direction from first ends 24 of the respective passages 22 towards second ends 26 of the respective passages 22.

In exemplary embodiments furcation tubes 40 being inserted into a furcation block 20 may have inner diameters 45 at the first ends 44 thereof which are equal to the inner diameters 47 at the respective second ends 46, and the inner diameters 45 of the first end portions 54 may be constant and equal to the inner diameters 47 of the respective second end portions 56 as discussed herein. Alternatively, however, such furcation tubes 40 being inserted into a furcation block 20 may be pre-flared and thus already have the increased diameters 45 as discussed herein.

Figure 2:
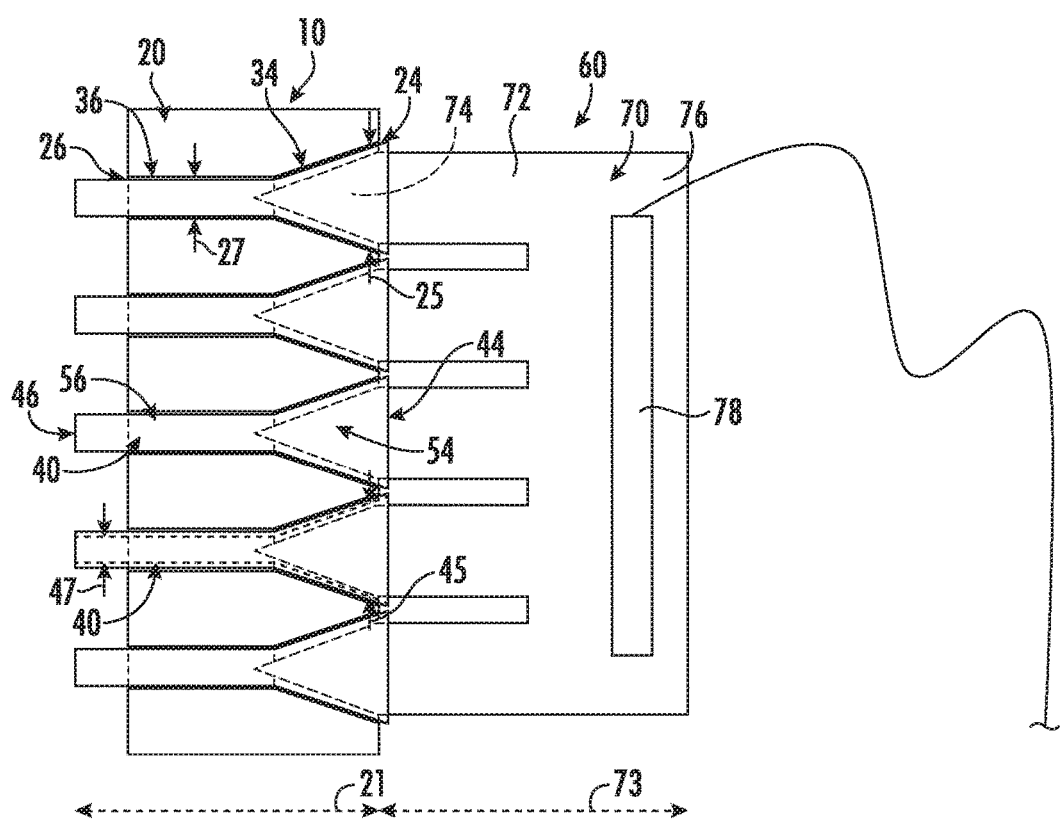
FIG. 2 is a side cross-sectional view of a plurality of furcation tubes in a furcation block after flaring of the furcation tubes with an expansion tool in accordance with embodiments of the present disclosure.

A method in accordance with the present disclosure may further include, for example, the step of flaring the first end portions 54 of the furcation tubes 40 such that the inner diameters 45 of the first ends 44 increase (as shown, for example, in FIG. 2). In exemplary embodiments, such flaring may cause the first end portions 54 to become tapered from the first ends 44 towards (and in exemplary embodiments to) the second end portions 56 of the respective furcation tubes 40. For example, such flaring may increase the inner diameter 45 of the first end 44 of each furcation tube 40 by between 50% and 350%, such as between 150% and 300%, such as between 200% and 275%, such as between 225% and 275%, relative to the inner diameter 45 of the first end 44 prior to flaring.

In exemplary embodiments, flaring as discussed herein includes inserting an expansion tool 70 into the first end portions 34 of the passages 22 and the first end portions 54 of the furcation tubes 40. Such insertion may be simultaneously for multiple passages 22 and furcation tubes 40 disposed therein, or may be in series for individual passages 22 and associated furcation tubes 40. In exemplary embodiments, such insertion includes the insertion of tapered end portions 74 into the first end portions 34 of the passages 22 and the first end portions 54 of the furcation tubes 40.

In exemplary embodiments, the flaring step may occur after the insertion step.

Figure 4:
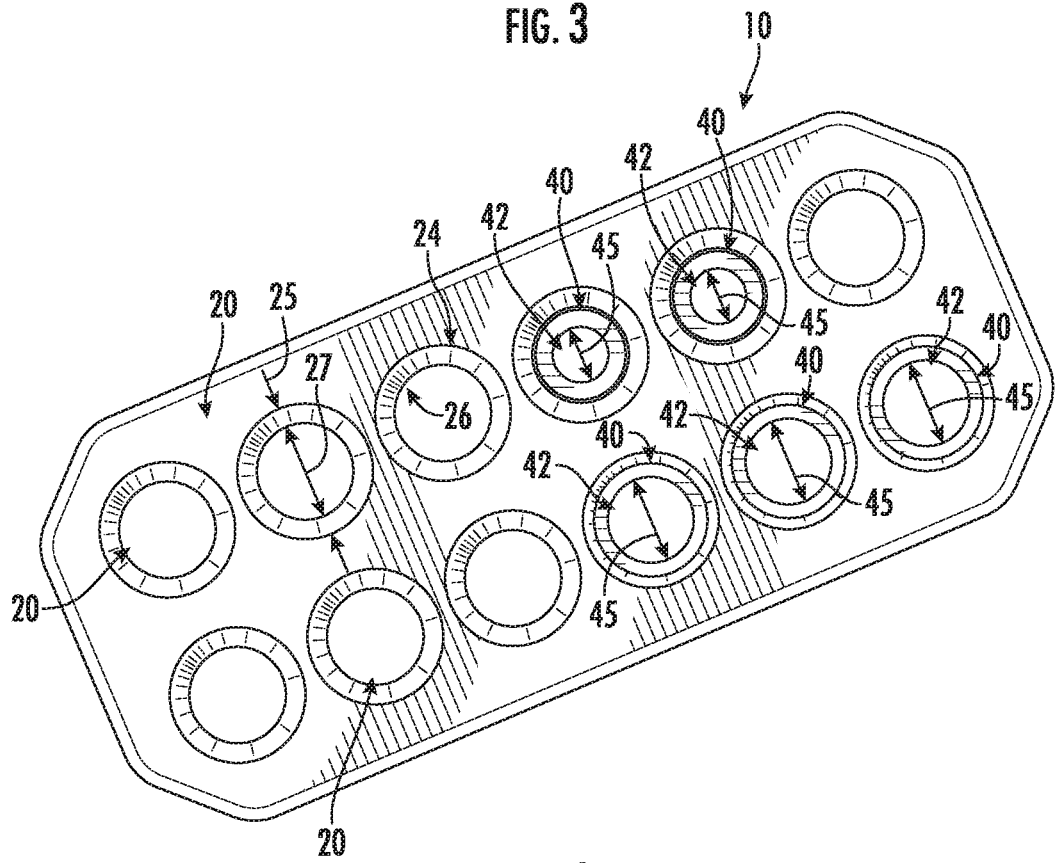
FIG. 4 is an end perspective view illustrating various furcation tubes in a furcation block both before and after flaring thereof in accordance with embodiments of the present disclosure.

FIG. 4 illustrates the furcation tubes 40 both before and after flaring for illustrative purposes. For example, in FIG. 4, two furcation tubes 40 are shown with first ends 44 having inner diameters 45 prior to flaring and three furcation tubes 40 are shown with first ends 44 having inner diameters 45 after flaring.

A method in accordance with the present disclosure may further include heating the first portions 54 of the furcation tubes 40 (as shown, for example, in FIG. 2). Such heating may, for example, be performed by the expansion tool 70, such as via a heater 78 thereof as discussed herein. Such heating may occur prior to or during flaring as discussed herein.

If heated, a method in accordance with the present disclosure may further include the step of cooling the first portions 54 of the furcation tubes 40. Such cooling may occur after flaring. Further, in some embodiments, such cooling may occur prior to removal of the expansion tool 70, such as by deactivating the heater 78. The first portions 54 may thus be allowed to cool in the flared positions. Alternatively, such cooling may occur after removal of the expansion tool 70.

Figure 3:
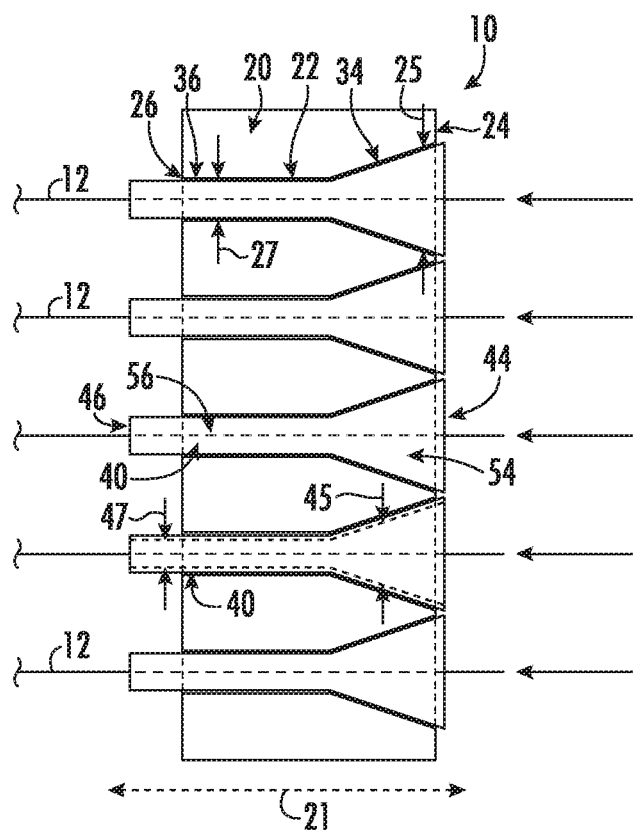
FIG. 3 is a side cross-sectional view of a plurality of furcation tubes in a furcation block after flaring of the furcation tubes with an expansion tool and after insertion of optical fibers in accordance with embodiments of the present disclosure.

A method in accordance with the present disclosure may further include, for example, the step of inserting one or more optical fibers 12 into the furcation tubes 40, such as through the first ends 44 of the furcation tubes 40 (as shown, for example, in FIG. 3). Such inserting step may occur, for example, after the flaring step, and may further occur, for example, after inserting the furcation tubes 40 into the passages 22 defined in the furcation block 20. In exemplary embodiments, such insertion is in a direction from first ends 44 of the respective passages 42 towards second ends 46 of the respective passages 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for assembling a fiber optic furcation unit, the method comprising:

inserting a furcation tube into a passage defined in a furcation block such that a first end portion of the furcation tube is disposed within a first end portion of the passage and the furcation tube extends from a second end of the passage, the passage extending along a longitudinal axis between a first end and the second end and comprising the first end portion which includes the first end and a second end portion which includes the second end, the furcation tube extending between a first end and a second end and comprising the first end portion which includes the first end and a second end portion which includes the second end, the first end of the passage having a diameter greater than a diameter of the second end of the passage;

flaring the first end portion of the furcation tube such that an inner diameter of the first end of the furcation tube increases; and inserting an optical fiber into the furcation tube through the first end of the furcation tube.

2. The method of claim 1, wherein the first end portion of the passage tapers from the first end of the passage to the second end portion of the passage.

3. The method of claim 1, wherein the second end portion of the passage has a constant diameter.

4. The method of claim 1, wherein flaring the first end portion of the furcation tube causes the first end portion of the furcation tube to be tapered from the first end of the furcation tube to the second end portion of the furcation tube.

5. The method of claim 1, wherein flaring the first end portion of the furcation tube increases the inner diameter of the first end of the furcation tube by between 50% and 350%.

6. The method of claim 1, wherein flaring the first end portion of the furcation tube increases the inner diameter of the first end of the furcation tube by between 150% and 300%.

7. The method of claim 1, wherein flaring the first end portion of the furcation tube comprises inserting an expansion tool into the first end portion of the passage and the first end portion of the furcation tube.

8. The method of claim 7, wherein the expansion tool comprises a tapered end portion, and wherein the tapered end portion is inserted into the first end portion of the passage and the first end portion of the furcation tube.

9. The method of claim 7, wherein the expansion tool comprises a heater.

10. The method of claim 1, further comprising heating the first end portion of the furcation tube during flaring.

11. A fiber optic furcation unit, comprising:
a furcation block, the furcation block defining a plurality of passages, each of the plurality of passages extending along a longitudinal axis between a first end and a second end and comprising a first end portion which includes the first end and a second end portion which includes the second end, wherein the first end of each of the plurality of passages has a diameter greater than a diameter of the second end of that passage; and
a plurality of furcation tubes, each of the plurality of furcation tubes disposed within and extending from one of the plurality of passages, each of the plurality of furcation tubes extending between a first end and a second end and comprising a first end portion which includes the first end and a second end portion which includes the second end, wherein the first end portion of each of the plurality of furcation tubes is disposed within the first end portion of one of the plurality of passages, wherein the first end of each of the plurality of furcation tubes has an inner diameter that is greater than an inner diameter of the second end of that furcation tube.

12. The fiber optic furcation unit of claim 11, wherein the first end portion of each of the plurality of passages tapers from the first end of that passage to the second end portion of that passage.

13. The fiber optic furcation unit of claim 11, wherein the second end portion of each of the plurality of passages has a constant diameter.

14. The fiber optic furcation unit of claim 11, wherein the first end portion of each of the plurality of furcation tubes tapers from the first end of that furcation tube to the second end portion of that furcation tube.

15. The fiber optic furcation unit of claim 11, wherein the inner diameter of the first end of each of the plurality of furcation tubes is between 50% and 350% greater than the inner diameter of the second end of that furcation tube.

16. The fiber optic furcation unit of claim 11, wherein the inner diameter of the first end of each of the plurality of furcation tubes is between 150% and 300% greater than the inner diameter of the second end of that furcation tube.

17. The fiber optic furcation unit of claim 11, further comprising a plurality of optical fibers, each of the plurality of optical fibers disposed in one of the plurality of furcation tubes.

18. The fiber optic furcation unit of claim 11, wherein there is no adhesive bond between any furcation tube and the furcation block.

* * * * *